(12) United States Patent
Wagner et al.

(10) Patent No.: US 11,062,099 B1
(45) Date of Patent: Jul. 13, 2021

(54) SYSTEM AND METHOD FOR WEARABLE, UBIQUITOUS RFID-ENABLED SENSING

(71) Applicant: United States of America as represented by the Administrator of the National Aeronautics and Space Administration, Washington, DC (US)

(72) Inventors: Raymond S Wagner, Houston, TX (US); Patrick W Fink, Missouri City, TX (US); David S. Hafermalz, Houston, TX (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 17/083,488

(22) Filed: Oct. 29, 2020

Related U.S. Application Data

(60) Provisional application No. 62/928,837, filed on Oct. 31, 2019.

(51) Int. Cl.
*G06K 7/10* (2006.01)
*G06K 19/07* (2006.01)

(52) U.S. Cl.
CPC ..... *G06K 7/10475* (2013.01); *G06K 7/10396* (2013.01); *G06K 19/0723* (2013.01)

(58) Field of Classification Search
CPC .................. G06K 7/10475; G06K 7/10396
(Continued)

(56) References Cited

U.S. PATENT DOCUMENTS 6,917,291 B2 7/2005 Allen
7,142,092 B2 11/2006 Ramamurthy et al.
(Continued)

FOREIGN PATENT DOCUMENTS

CN 101183423 A 5/2008
CN 202404129 U 8/2012
(Continued)

OTHER PUBLICATIONS

R. S. Wagner and R. J. Barton, "Delay tolerant, radio frequency identification (RFID)-enabled sensing," 2014 IEEE International Conference on Wireless for Space and Extreme Environments (WiSEE), Noordwijk, 2014, pp. 1-8, doi: 10.1109/WiSEE.2014.6973078.
(Continued)

*Primary Examiner* — Allyson N Trail
(74) *Attorney, Agent, or Firm* — David G. Matthews; Kurt G. Hammerle; Edward K. Fein

(57) ABSTRACT

A system includes a plurality of radiofrequency identification (RFID) tags including a first RFID tag. The first RFID tag is configured to perform RFID tag operations that include acquiring one or more samples using a sensor of the first RFID tag. The RFID tag operations also include writing the one or more samples in a memory of the first RFID tag. The RFID tag operations also include transferring custody of the one or more samples to a first RFID reader on request. The system also includes a plurality of RFID readers including the first RFID reader. The first RFID reader is configured to perform RFID reader operations including reading an identifier from each of the plurality of RFID tags in view of the first RFID reader during an inventory management mode.

20 Claims, 10 Drawing Sheets

(58) Field of Classification Search
USPC ........................................................ 235/451
See application file for complete search history.

(56) References Cited

U.S. PATENT DOCUMENTS

| | | |
|---|---|---|
| 7,267,275 B2 | 9/2007 | Cox, Jr. et al. |
| 7,433,648 B2 | 10/2008 | Bridgelall |
| 7,667,572 B2 | 2/2010 | Husak et al. |
| 7,956,724 B2 | 6/2011 | Venkatesh et al. |
| 8,269,633 B2 | 9/2012 | Hollander et al. |
| 8,386,730 B2 | 2/2013 | Yamasaki |
| 8,542,102 B2 | 9/2013 | Deuber et al. |
| 8,988,223 B2 | 3/2015 | Puleston et al. |
| 9,041,513 B1 | 5/2015 | Pai et al. |
| 9,058,528 B2 | 6/2015 | Agarwal et al. |
| 9,107,033 B2 | 8/2015 | An et al. |
| 9,424,447 B2 | 8/2016 | Puleston et al. |
| 9,558,382 B2 | 1/2017 | Kocacic et al. |
| 9,928,342 B1 | 3/2018 | LaBorde |
| 2005/0088284 A1 | 4/2005 | Zai et al. |
| 2006/0267731 A1 | 11/2006 | Chen |
| 2007/0043834 A1 | 2/2007 | Banerjee |
| 2007/0096874 A1 | 5/2007 | Mravca |
| 2007/0205916 A1 | 9/2007 | Blom et al. |
| 2008/0074263 A1 | 3/2008 | Rofougaran |
| 2008/0103944 A1 | 5/2008 | Hagemann et al. |
| 2008/0174404 A1 | 7/2008 | Gopalan et al. |
| 2008/0198016 A1 | 8/2008 | Lawrence et al. |
| 2009/0024584 A1 | 1/2009 | Dharap et al. |
| 2009/0189743 A1 | 7/2009 | Abraham et al. |
| 2010/0127875 A1 | 5/2010 | Wong |
| 2011/0302264 A1 | 12/2011 | Lawrence et al. |
| 2012/0044055 A1 | 2/2012 | Kovacic et al. |
| 2016/0321480 A1 | 11/2016 | Hamlin et al. |
| 2018/0189528 A1* | 7/2018 | Hanis ................... G06Q 10/087 |
| 2019/0043010 A1* | 2/2019 | Smith ................ G06Q 10/0833 |
| 2019/0163942 A1 | 5/2019 | Lavery et al. |

FOREIGN PATENT DOCUMENTS

| | | |
|---|---|---|
| JP | 5416619 B | 2/2014 |
| WO | WO2014042508 | 3/2014 |
| WO | 2223469 | 2/2015 |

OTHER PUBLICATIONS

Soujeri, Ebrahim A., Rahim Rajan, and A. Harikrishnan. "Design of a zigbeebased RFID network for industry applications." Proceedings of the 2nd international conference on Security of information and networks. ACM, 2009.

Bhattacharya, Indrajit, and Uttam Kumar Roy. "Optimal placement of readers in an RFID network using particle swarm optimization." International Journal of Computer Network & Communications 2.6 (2010): 225-234.

Zhao, Yi Zhi, and Oon Peen Gan. "Distributed design of RFID network for largescale RFID deployment." 2006 4th IEEE International Conference on Industrial Informatics. IEEE, 2006.

Vasenev, Alexandr, Timo Hartmann, and Andries G. Doree. "A distributed data collection and management framework for tracking construction operations." Advanced engineering informatics 28.2 (2014): 127-137.

* cited by examiner

SYSTEM AND METHOD FOR WEARABLE, UBIQUITOUS RFID-ENABLED SENSING

CROSS-REFERENCE TO RELATED APPLICATIONS

This application claims priority to Provisional Patent Application No. 62/928,837, filed on Oct. 31, 2019, the entirety of which is incorporated by reference herein.

GOVERNMENT RIGHTS

The invention described herein was made by employees of the United States Government and may be manufactured and used by or for the Government of the United States of America for governmental purposes without the payment of any royalties thereon or therefor.

BACKGROUND

Wireless systems and methods may be used in vehicles, buildings, towers, appliances, etc. to provide communication at a reduced overall weight (e.g., due to the lack of wires). Wireless communication also affords the flexibility to add wearable, on-body sensors without constraining a wearer's range of motion by virtue of a cable harness acting as a tether.

NASA has been interested in wirelessly monitoring the environment in the immediate vicinity of its crew members aboard the International Space Station (ISS), especially for the study of potentially hazardous situations such as the aggregation of $CO_2$ gas bubbles in microgravity. One related approach by NASA for wearable sensors in a wireless communication system uses Bluetooth Low Energy (BLE) on-orbit. This approach gathers useful data, but the reliance on commercial off-the-shelf (COTS) active wireless protocols such as BLE limits the operational lifetime of such system, currently rated at a few days on a rechargeable battery. Accordingly, there is a long-felt need for an improved wearable/peel-and-stick system and method for wireless communication.

SUMMARY

A system is disclosed. The system includes a plurality of radiofrequency identification (RFID) tags including a first RFID tag. The first RFID tag is configured to perform RFID tag operations that include acquiring one or more samples using a sensor of the first RFID tag. The RFID tag operations also include writing the one or more samples in a memory of the first RFID tag. The RFID tag operations also include transferring custody of the one or more samples to a first RFID reader on request. The system also includes a plurality of RFID readers including the first RFID reader. The first RFID reader is configured to perform RFID reader operations including reading an identifier from each of the plurality of RFID tags in view of the first RFID reader during an inventory management mode. The RFID reader operations also include transmitting the identifier from each of the RFID tags in view to a sensor controller during the inventory management mode. Transmitting the identifier includes transmitting a first identifier for the first RFID tag to the sensor controller. The RFID reader operations also include receiving a first custody transfer command from the sensor controller based at least in part on the sensor controller receiving the first identifier. Based at least partially upon receiving the first custody transfer command, the RFID reader operations also include reading the one or more samples from the first RFID tag to take custody of the one or more samples during a custody transfer servicing mode. During the custody transfer servicing mode, the RFID reader operations also include writing a second custody transfer command to the memory of the first RFID tag to indicate that the first RFID reader has taken custody of the one or more samples. The sensor controller is configured to be in communication with the plurality of RFID readers. The sensor controller is configured to perform sensor controller operations including receiving the first identifier from the first RFID reader during the inventory management mode. The sensor controller operations also include determining that the first RFID tag is in view of the first RFID reader based on receiving the first identifier. The sensor controller operations also include transmitting the first custody transfer command to the first RFID reader to cause the first RFID reader to request the one or more samples from the first RFID tag.

A method is also disclosed. The method is for the collection of information from a plurality of radio-frequency identification (RFID) tags using an RFID system. The method includes scanning for the plurality of RFID tags with a plurality of RFID readers. The plurality of RFID readers includes a first RFID reader having a first coverage area and configured to detect one or more of the plurality of RFID tags when positioned in the first coverage area. The method also includes receiving RFID tag identifiers corresponding to the plurality of RFID tags with the first RFID reader. The RFID tag identifiers include a first RFID tag identifier corresponding to a first RFID tag of the plurality of RFID tags. The method also includes transmitting the RFID tag identifiers from the first RFID reader to a sensor controller. The method also includes identifying the first RFID tag identifier in the RFID tag identifiers using the sensor controller. The method also includes determining that the first RFID tag is likely to have custody of sensor data. The method also includes issuing a first custody transfer command from the sensor controller to the first RFID reader based at least in part on the determination that the first RFID tag is likely to have custody of the sensor data. The method also includes reading the sensor data from the first RFID tag using the first RFID reader in response to the first custody transfer command. The method also includes writing a second custody transfer command from the first RFID reader to the first RFID tag.

In another embodiment, the system includes a radiofrequency identification (RFID) tag configured to perform RFID tag operations. The RFID tag operations include transferring custody of data in a packet buffer of a memory of the RFID tag to an RFID reader, thereby freeing the packet buffer to receive new data. The RFID tag operations also include acquiring one or more samples using a sensor of the RFID tag. The RFID tag operations also include storing the one or more samples in a sample buffer of the memory of the RFID tag. The RFID tag operations also include removing a first entry in the sample buffer when the first entry contains greater than or equal to a threshold number of the one or more samples. The RFID tag operations also include encapsulating the first entry as a packet. The packet includes the one or more samples and packet metadata. The RFID tag operations also include placing the packet in the packet buffer in response to a custody transfer request from the RFID reader. The RFID tag operations also include adding an empty entry to the packet buffer when the sample buffer contains less than the threshold number of the one or more samples. The RFID tag operations also include allowing acquisition of new samples into a second entry in the sample buffer concurrently with processing a new custody transfer request from the RFID reader.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein.

DETAILED DESCRIPTION

Figure 1:
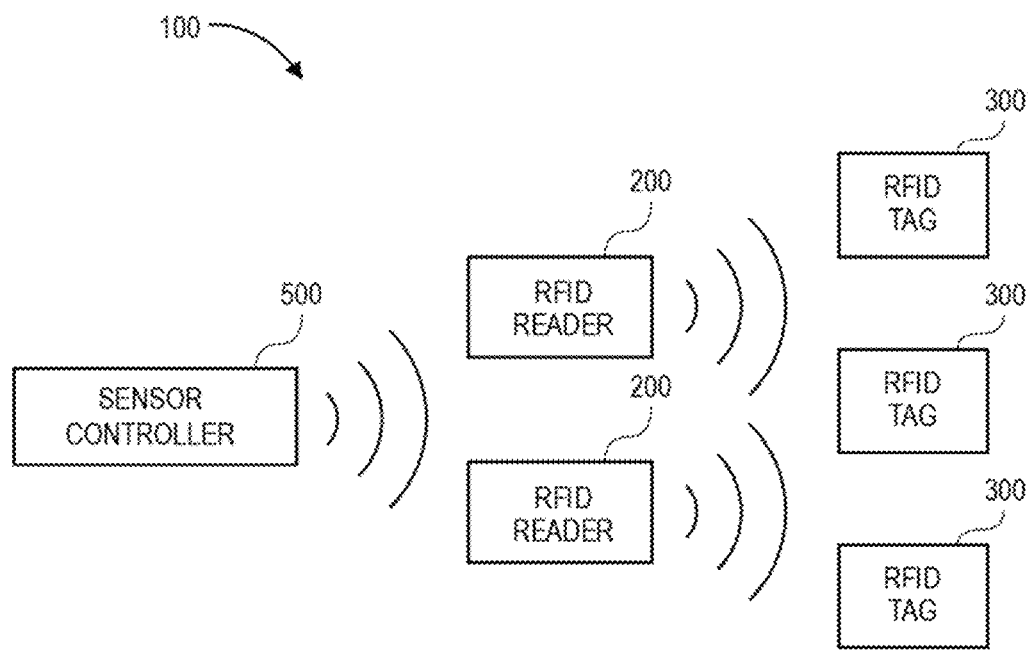
FIG. 1 illustrates a schematic view of a radio frequency identification (RFID)-enabled information collection system including an RFID reader/interrogator, an RFID tag, and an RFID sensor controller, according to an embodiment.

Reference may now be made in detail to specific embodiments illustrated in the accompanying drawings and figures. In the following detailed description, numerous specific details are set forth in order to provide a thorough understanding of the embodiments described herein. However, it may be apparent to one of ordinary skill in the art that other embodiments may be practiced without these specific details. In other instances, well-known methods, procedures, components, circuits, and networks have not been described in detail so as not to unnecessarily obscure aspects of the embodiments.

It may also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It may also be understood that the term "and/or" as used herein refers to and encompasses any and all possible combinations of one or more of the associated listed items. It may be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The embodiments described herein include systems and methods that use radio frequency identification (RFID) technology to transport data to an RFID inventory system. In one embodiment, the RFID inventory system may be aboard the ISS and may exploit the inherently passive nature of RFID sensor tags to provide wearable or structure-mountable, wireless sensors that are capable of operating for one or more years on small coin battery cells. The embodiments described herein include a store-and-forward overlay on RFID reader and RFID sensor tag protocols that allow an RFID sensor tag to transmit signals through a system of RFID interrogators (also referred to as RFID readers), exploiting contact opportunities as they arise, and quietly transferring sensor readings at nearly no power cost to the wireless RFID sensor itself. This approach essentially zeros-out the largest element of the power budget of a typical Internet of Things (IoT) sensor. The embodiments described herein also include wearable RFID sensors using commercially available components that have been modified to become part of a system and method for wearable, ubiquitous RFID-enabled sensing that is imminently manufacturable.

In one embodiment, the RFID system may be configured to automate collection of data and may include a plurality of RFID interrogators and a plurality of RFID tags. Each RFID tag may have at least one processor and memory for (1) storing a set of instructions and data and (2) implementing over-the-air RFID services (e.g., Electronic Product Code (EPC) memory and User Memory (UM) in EPC Global Class 1 Generation 2). When the set of instructions is executed by the at least one processor, it causes the RFID tag to perform operations. The operations include: (a) on command, sampling by collecting data into a "sample buffer" section of the memory; (b) loading a first packet of data into a "packet buffer" (primary portion; accessible over-the-air, e.g., UM) of the RFID tag memory for collection by one of the plurality of RFID interrogators once a packet worth of data has been collected; (c) continue collecting additional samples of data into the sample buffer (e.g., secondary portion; not accessible over-the-air) of the RFID tag memory to be used to form "subsequent" packets, allowing continuous data gathering, even while the primary portion of the RFID tag memory is filled with a packet; (d) maintaining custody of the subsequent packets until the RFID tag has been explicitly informed of a custody transfer of the first packet of data by one of the plurality of RFID interrogators; (e) building each subsequent packet using samples from the sample buffer according to a prioritization scheme, and loading the packet into the packet buffer once custody of the first packet of data stored in the primary buffer section has been transferred to the RFID interrogator; and (f) maintaining a time-base estimate for time-tagging the packets of data collected as samples and processing time-base updates from the RFID interrogator.

In another embodiment, the RFID system may be configured to automate collection of data. The system may include at least one RFID sensor tag and a plurality of RFID readers. Each RFID reader may have at least one processor and memory system for storing a set of instructions. The set of instructions on the RFID reader, when executed by the at least one processor, causes the RFID reader to realize that an RFID sensor tag is in range of signal reception (e.g., either on its own initiative or through notification from an RFID reader coordinator). The set of instructions also causes the RFID reader to determine whether unrecovered sensor data is present on the RFID sensor tag and to take "custody" of a "packet" of sensor data on the RFID tag identified as being within range of signal reception. This step of taking custody may include, as an example, informing the RFID sensor tag that custody has been transferred and instructing the same RFID sensor tag to queue up a second packet of data. The set of instructions may optionally update the time-base of the RFID sensor tag or execute other procedures.

In another embodiment, a method is disclosed for using a system of RFID interrogators and/or readers to support the collection of sensor data from ultra-low power, wearable or surface-mountable, moveable RFID sensor tags. The method uses a store-and-forward approach to manage the collection of data from the RFID sensor tags, even when they are not in range of an individual RFID interrogator, and as they move from the coverage area of one RFID interrogator to the next in a complex structure such as the ISS, a hospital, or an industrial facility. This method allows use of RFID for transporting sensor data in a complex environment where instantaneous access to an RFID interrogator cannot be guaranteed, extending RFID data collection to mobile, wearable sensing. By using RFID systems and methods for data transport and off-loading the consumption of power for communication from the wireless sensor tag, the method enables wearable RFID-enabled sensing with years-long lifetimes on small, consumable coin cell batteries.

The system and method disclosed herein manage automatic downloading of RFID sensor data logs within a multiple-RFID interrogator ecosystem. The system and method do not require explicit wearer-user intervention. The system and method also allow any one of a multiplicity of networked RFID interrogators to communicate with an RFID tag and transfer logged data stored on such tag. The system and method also support a high amount of mobility of the RFID tag, both when located within the broad coverage area of the networked RFID interrogators and when located outside the RFID interrogator coverage area. The system and method also are interleaved with inventory management interrogations, such that they do not significantly impact the primary interrogation task. The system and method also use all standard EPC Global Class 1 Generation 2 (C1G2) commands when implemented using the C1G2 protocol, which means they does not require any proprietary command-set extensions.

In another embodiment, the system and method may treat the user memory (UM) of the RFID tag as a delay-tolerant radio link. The system and method also include a set of instructions on the RFID interrogator side to:
 a. realize that an RFID tag is in view (either on its own or through notification from an interrogator coordinator);
 b. determine that unrecovered sensor data is present on the RFID tag;
 c. take "custody" of a "packet" of sensor data on that tag (e.g., inform the tag that custody has been transferred and instruct it to queue up the next packet of data); and
 d. optionally update the time-base of the tag or execute any other required procedures (e.g., stop sampling, re-configure sampling period, etc.).

The system and method also include a set of instructions on the RFID tag side to:
 a. on command, begin sampling data into a buffer organized into "packets" of data;
 b. load a packet into primary ("packet buffer") tag memory for collection by an interrogator if a packet worth of data has been collected;
 c. continue sampling into a secondary buffer ("sample buffer") of subsequent packets, allowing continuous data gathering even while the primary tag memory is filled;
 d. maintain custody of the data in the packet buffer until it has been explicitly informed of a custody transfer by an interrogator;
 e. load the "next" packet's worth of samples from the sample buffer into the packet buffer in the tag memory (according to some prioritization scheme, e.g., packet age) when custody of data in the packet buffer has been transferred to the interrogator; and
 f. maintain a time-base estimate for time-tagging samples and provide a method for allowing the interrogator to update the time base estimate.

The system and method also include a set of instructions for individual RFID interrogators in a multi-interrogator system to populate a common database of sensor readings without needing to know details of the last RFID interrogator/tag interaction. This may include a sensor coordinator observing inventory management tag reads from the population of interrogators, and scheduling data transfers for individual tags with individual interrogators. This may optionally use interrogator/antenna/frequency information from inventory management interrogations to seed the "custody transfer" process.

The systems and methods disclosed herein include an RFID reader (also referred to herein as an RFID interrogator) and an RFID tag that provide RFID-enabled information collection that can be used for monitoring and gathering data wirelessly from a host structure. In an embodiment, the RFID tag may be a wearable tag that is positioned on or near a human body (e.g., coupled to clothing). Examples of a host structure may be or include the structural members, interior walls, or equipment of a crewed or robotic vehicle (e.g., a spacecraft) or similar elements of a space habitat. Such systems and methods may operate at low power for long durations by implementing a first protocol for offline data gathering and a second protocol for low-power data transfer.

Transmission of data is managed by a network of RFID interrogators running a store-and-forward software overlay that is compatible with similar software running on the RFID sensor tag as well as a centralized controller commanding interrogators and tags to interact at moments of opportunity. Below, the tag, the interrogator, and the sensor controller components of this system are described.

FIG. 1 illustrates a schematic view of an RFID-enabled information collection system 100, according to an embodiment. The system 100 includes a sensor controller 500. The system 100 also includes one or more RFID readers (also referred to herein as an RFID interrogators) 200. The RFID readers 200 may be in wired or wireless communication with the sensor controller 500. The system 100 also includes one or more RFID tags 300. The RFID tags 300 may be in wireless communication with the RFID readers 200. As described below, the system 100 may be configured to collect/acquire, store, receive, and/or transmit time-series data ("forward") from each of a plurality of sensor devices.

Figure 2:
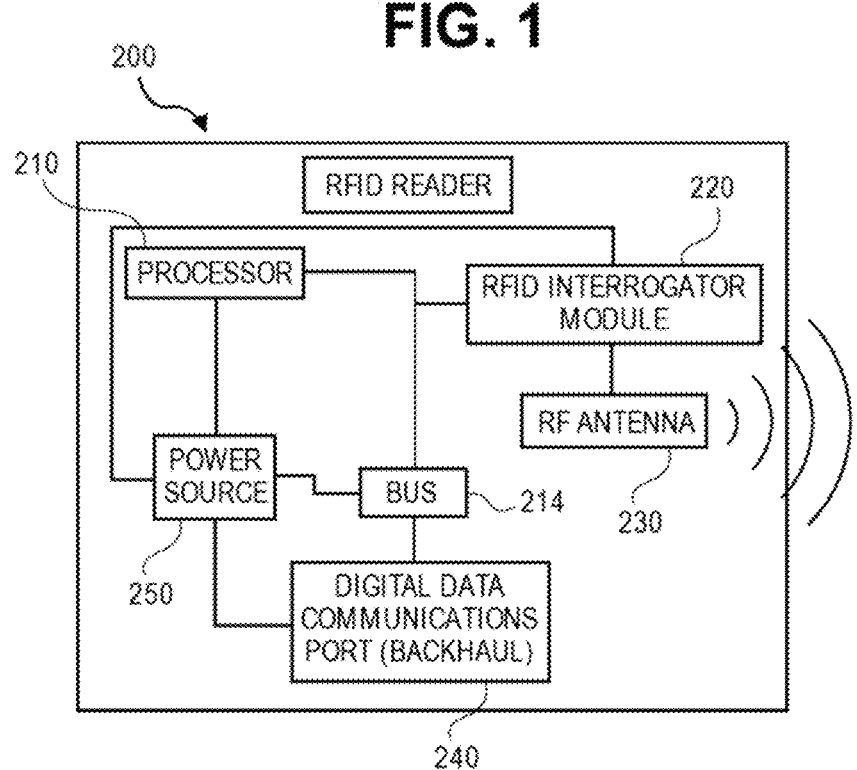
FIG. 2 illustrates a schematic view of the RFID reader of FIG. 1, according to an embodiment.

FIG. 2 illustrates a schematic view of the RFID reader 200, according to an embodiment. The RFID reader 200 may include a central processing unit (CPU) or microprocessor 210, a communication bus 214, at least one RFID interrogator module 220, at least one RF antenna 230, a digital data communications port or backhaul network 240, and a power source 250.

The processor 210 may include a set of instructions for implementing and performing the steps of functionality outlined below. The processor 210 may be embodied as an application-specific integrated circuit (ASIC) chip, a field programmable gate array (FPGA), a microcontroller unit (MCU), a single board computer, or such other computing mechanism capable of storing in a memory integrated thereto a set of instructions written in human-readable format (e.g., source code, VHDL) and converting such instructions into a set of machine-readable digital instructions (e.g., binary code) for operating the RFID reader 200.

The at least one RFID interrogator module 220 may include either a distinct integrated circuit connected via the bus 214 (e.g., serial interface) or a circuit module internal to the processor 210. Each RF antenna 230 may interface to/with the RFID interrogator module 220 and may be configured to send command sequences to the RFID tag 300. The RF antenna 230 may also be configured to receive transmitted information collected and transmitted by the RFID tag 300.

The digital data communications port or backhaul network 240 may be operatively connected to the processor 210 and the RFID interrogator module 220 to "offload" collected sensor data that is either wired (e.g., via Ethernet) or wireless (e.g., via Wi-Fi).

Figure 3:
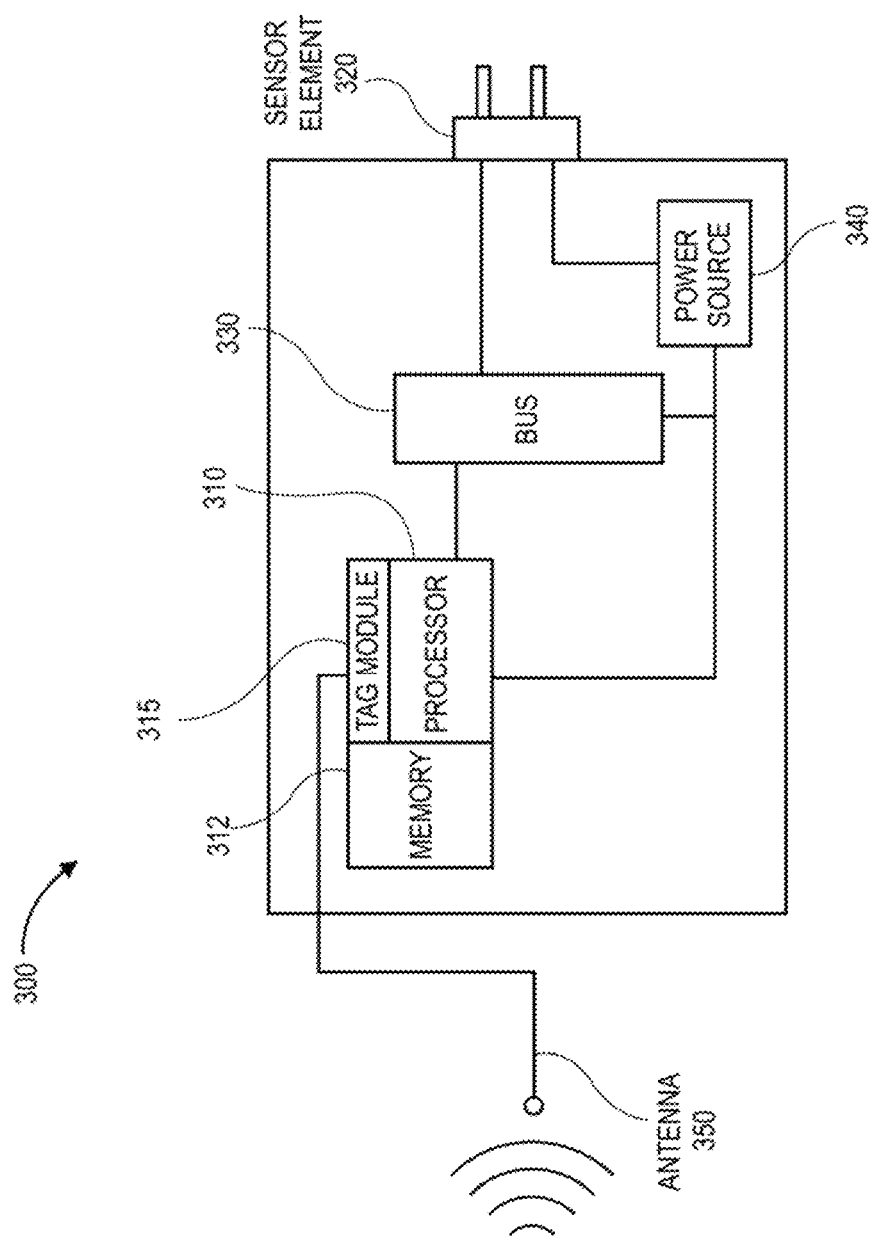
FIG. 3 illustrates a schematic view of the RFID tag of FIG. 1, according to an embodiment.

FIG. 3 illustrates a schematic view of the RFID tag 300, according to an embodiment. The RFID tag 300 may include a tag central processor unit (CPU) or microcontroller unit (MCU) 310 having a memory 312. The RFID tag 300 may also include at least one sensor element 320 for sensing and collecting a data set of information (e.g., a physical measurement). The sensor element 320 may be or include, for example, a thermocouple element, a strain gauge, a carbon dioxide sensor, a light sensor, a temperature sensor, a humidity sensor, an air quality sensor, a low-bandwidth accelerometer, or the like. The RFID tag 300 may also include a communications bus 330, a power source 340, and at least one transceiving antenna 350.

The MCU 310 includes a set of instructions stored on its memory 312 to cause the RFID tag 300 to perform a set of steps as may be described in further detail below with reference to FIGS. 6A, 6B, and 9. Each sensor element 320 may be configured to sense a parameter of interest to enable the collection of a set of information. For example, the parameter of interest may be or include temperature when the sensor element is a thermocouple, the presence of a chemical when the sensor is chemical sensor, strain when the sensor is a strain gauge. The MCU 310 may further include at least one RFID tag module 315 for implementing a wakeup channel. The at least one RFID tag module 315 may be configured to generate a wakeup pulse signal when a particular data sequence is transmitted by the RFID reader 200 to the RFID tag module 315.

The transceiving antenna 350 may be connected to the RFID tag module 315 for receiving data sequences and for transmitting a set of information collected from the at least one sensor element 320. The power source 340 may maintain the tag state when not under interrogation by the RFID reader 200. In one embodiment, the power source 340 may be or include a consumable battery. In another embodiment, the power source 340 may be or include a power harvester coupled with a power storage device. In yet another embodiment, the power source 340 may be or include a combination of both a consumable power supply and a power harvester.

Accordingly, RFID tag operation (e.g., hibernating, wakeup, and/or sampling) may be powered entirely by using power harvested from the data sequence transmitted by the RFID reader 200. In such an embodiment, the power source 340 may be configured to harvest power from the transmitted signal of the RFID reader 200 or another source of ambient energy (e.g., thermal gradients). In another embodiment, a portion of the operating power may be generated by using power harvested from the data sequence of the RFID reader 200, with the remaining power being provided by another power supply integrated with a power harvester contained within power source 340, such as a battery. In yet another embodiment, the power source 340 may include a battery without a power harvester.

The RFID tag module 315 may be an integrated circuit module internal to the MCU 310. In another embodiment, the RFID tag module 315 may be a distinct integrated circuit connected via a circuit bus (e.g., serial interface) to the MCU 310, similar to the configuration shown in FIGS. 6A and 6B, which are described below.

Figure 4:
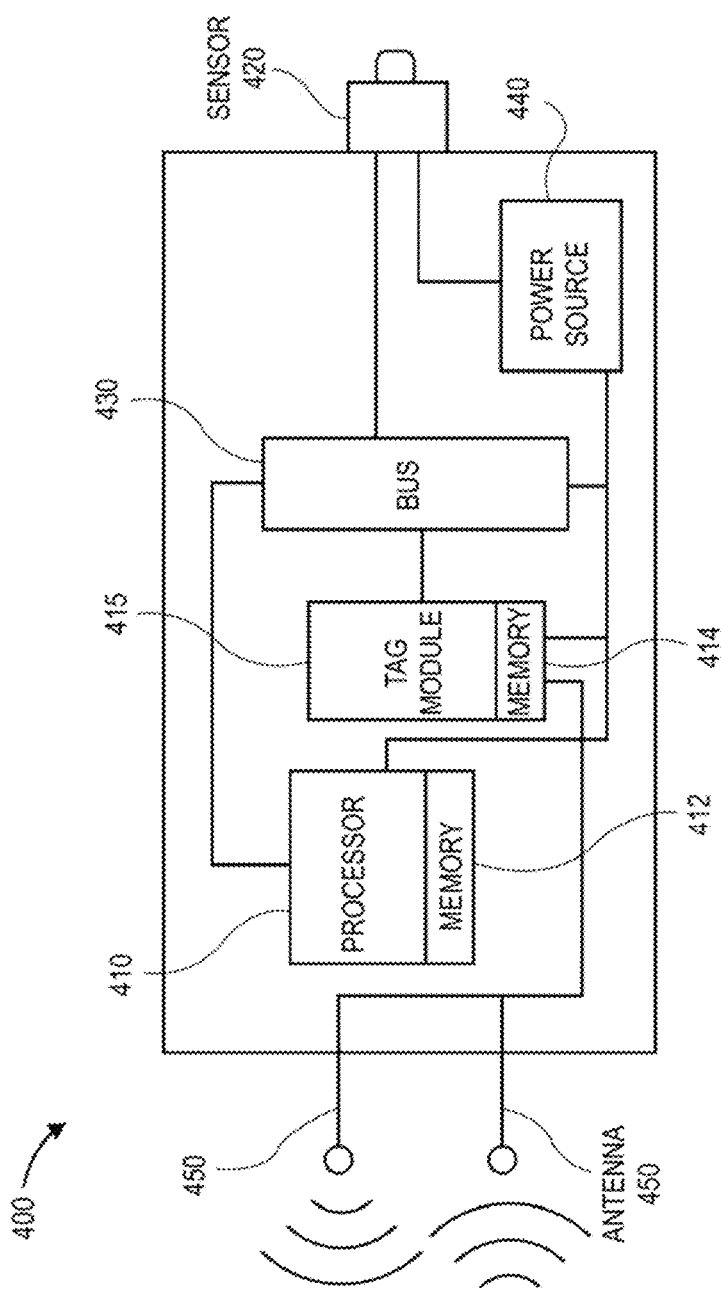
FIG. 4 illustrates a schematic view of another RFID tag (similar to the RFID tag in FIG. 3) including a distinct integrated circuit connected via a serial interface to a low-power microcontroller unit (MCU), according to an embodiment.

FIG. 4 illustrates a schematic view of another RFID tag 400 (similar to the RFID tag 300 in FIG. 3) including a distinct integrated circuit connected via a serial interface to a low-power MCU, according to an embodiment. The RFID tag 400 may include at least one RFID tag module 415 for implementing a wakeup channel. The RFID tag 400 may also include an MCU 410 configured to periodically wake itself from a low power state (e.g., either on a schedule or driven by an external interrupt). The MCU 410 may also be configured to monitor the RFID tag module 415 for the presence of a particular data sequence. The RFID tag module 415 may be a distinct integrated circuit connected via a circuit bus 430 (e.g., serial interface).

The RFID tag 400 may use a new class of serial-addressable EPC Global C1G2 RFID integrated circuits (ICs) for the RFID tag module 415. Such an IC, in addition to being a C1G2-compliant RFID device, adds a serial interface (e.g., SPI, I2C, UART) through which the C1G2 memory banks can be read or written by an attached device, such as a small microcontroller. The RFID reader 200 may provide the power to read/write a tag memory 414 using the OTA interface. The attached processor 410 provides the set of instructions stored on a processor memory 412 to read/write tag the memory 414 using the serial interface and configure interrupt-based wakeup should the service be provided by the RFID IC. When neither interface is engaged, the RFID IC may be completely powered down.

Though the memory architecture of the RFID tag 300, 400 may vary (e.g., EEPROM, FRAM, etc.), all serial-addressable tags may share one common feature: reading from and/or writing to the tag memory 414 consumes relatively little power compared to the power draw of active transmitter/receiver protocols such as BLE, ZigBee, and Wi-Fi. Thus, the RFID reader 200 can write data using the OTA interface to the RFID tag memory 414 using only power from the RFID reader 200. Then, with only a small cost to the integrated tag/processor device's power supply 440, the processor 410 can read the data out over the serial interface.

The RFID tag 400 may also include at least one RF transceiving antenna 450 (two are shown) operatively connected to the RFID tag module 415 for receiving data sequences and/or for transmitting a set of information collected from the at least one sensor element 420. As described earlier with reference to the RFID tag 300 of FIG. 3, the RFID tag 400 may also include a power source or supply 440 to maintain the tag state when not under interrogation by the RFID reader 200. In one embodiment, the power source 440 may be a consumable battery. In another embodiment, the power source 440 may be a power harvester coupled with a power storage device. In yet another embodiment, the power source 440 may be a combination of a both consumable power supply (e.g., a button battery) and a power harvester.

The embodiments disclosed herein may use a serial-addressable RFID interface in an RFID tag 300, 400 so that the RFID reader 200 can "wake up" a "sleeping" wireless sensor 320, 420 that has been placed into long-term, low-power hibernation when instructed to do so by the sensor controller 500. The wireless sensor 320, 420 may be part of the RFID tag 300, 400.

As mentioned above with reference to FIG. 3, the (e.g., wireless) RFID tag 300 may include a low-power microcontroller unit (MCU) 310 and a serial-addressable RFID integrated circuit (IC) (e.g., a telemetry interface) 315 for transmitting sensor data and for implementing a wakeup channel (i.e., a wakeup interface). In the hibernating configuration, the MCU 310 may be the only element in the RFID tag 300 that draws power, and the MCU 310 may be operating in the lowest power mode possible. In at least one embodiment, in the lowest possible power mode, either nothing happens, or a watchdog timer is monitored to ensure that the processor can be reset in the event of a software problem. When it is time to bring the RFID tag 300 into an active (e.g., higher-power) state, the RFID reader 200 transmits (i.e., writes) a configuration command into one of the memory banks of the RFID tag 300 (e.g., the user memory (UM) bank optionally included in the EPC Global Class 1 Generation 2 (C1G2) protocol). Upon detection of this event, the MCU 310 reads out the configuration command from the RFID reader 200 and engages the telemetry interface 315 as appropriate to the command. By using a passive channel afforded by the wakeup interface, the sensor processor 310 may avoid the significant power draw of periodically turning on its wakeup channel, connecting to the RFID reader 200 (i.e., the master device), and checking for pending wakeup messages.

A passive wakeup channel can also have one additional advantage: some models of serial-addressable RFID IC can be configured to generate a "wakeup pulse" on one of the serial input/output lines when a particular data sequence is written over-the-air (OTA) to an RFID IC of the RFID tag 300. In one embodiment, this pulse may be generated by using power harvested from the RFID reader 200, and the MCU 310 can be configured to generate and service a hardware interrupt on detection of that pulse. This configuration provides an extremely low-latency wakeup capability, because detection of the wakeup command may be handled entirely via the hardware. Conventional models lack this feature, which means the MCU may be configured to periodically wake up and read the contents of a fixed block of tag memory for new configuration commands. Although this type of embodiment cycles the MCU 310 through its active state more often, the power required to do so is much less than if an active radio channel were powered on as well. Also, the time taken to read the configuration register may be much shorter than the connection time of a protocol such as Bluetooth® Low Energy (BLE), so the average time spent in the active period checking for new configuration commands is much shorter. The wakeup period can be adjusted to provide the desired latency in decoding and acting upon configuration commands.

The MCU 310, 410 has a memory 312, 412 that includes a set of instructions for receiving a time-base synchronization signal from the RFID reader 200 through the RFID module 315, 415 and updating/refining the time base maintained by the MCU 310, 410 using such synchronization data over the course of operation. The steps for maintaining synchronization includes a step for efficiently encoding timestamps of a sequence of data samples. The set of instructions also includes a method for maintaining concurrent acquisition of a new sequence of data samples on the MCU 310, 410 while downloading (i.e., communicating) a previous sequence of data samples from the memory bank of the RFID module tag memory 315, 415 to the RFID reader 200.

During data acquisition by the RFID tag 300, 400, the tag software includes a set of instructions that cause the RFID tag 300, 400 to automatically enter a low-power state when the tag is (1) not actively gathering data samples from sensor element 320, 420 and/or (2) not actively writing data samples to or reading data from the memory bank of RFID module 315, 415.

Further, during data acquisition by the RFID tag 300, 400, the tag software includes a set of instructions that cause the RFID tag 300, 400 to automatically return to a high-power state per the data sampling schedule to (1) gather data samples from the at least one sensor element 320, 420 and/or (2) write data samples to the RFID tag memory 312, 412.

Figure 5:
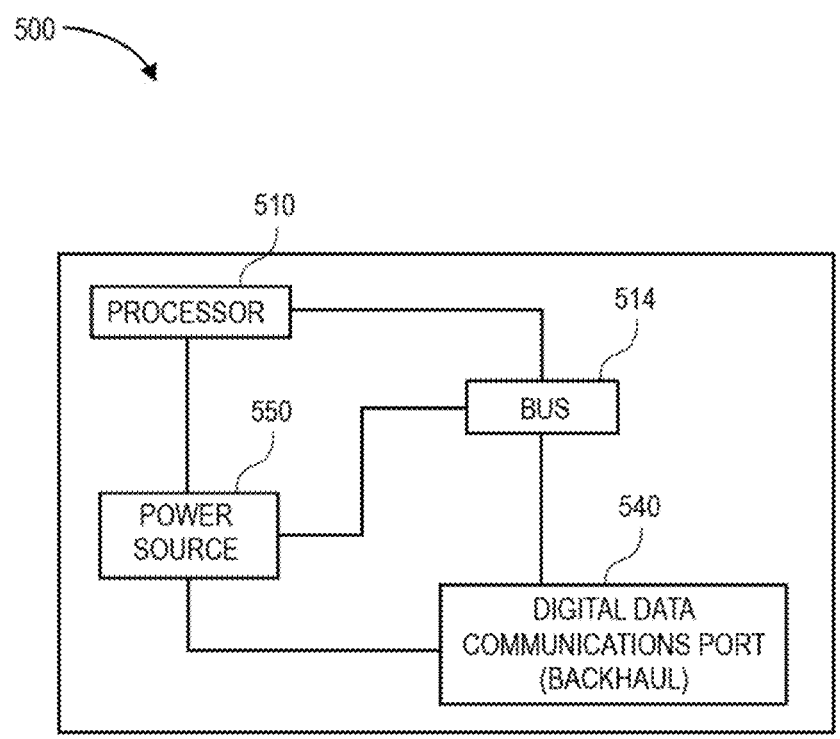
FIG. 5 illustrates a schematic view of the RFID sensor controller of FIG. 1, according to an embodiment.

FIG. 5 illustrates a schematic view of the sensor controller 500, according to an embodiment. The sensor controller 500 may include a central processing unit (CPU) or microprocessor 510, a communication bus 514, a digital data communications port or backhaul network 540, and a power source 550.

Figure 6A:
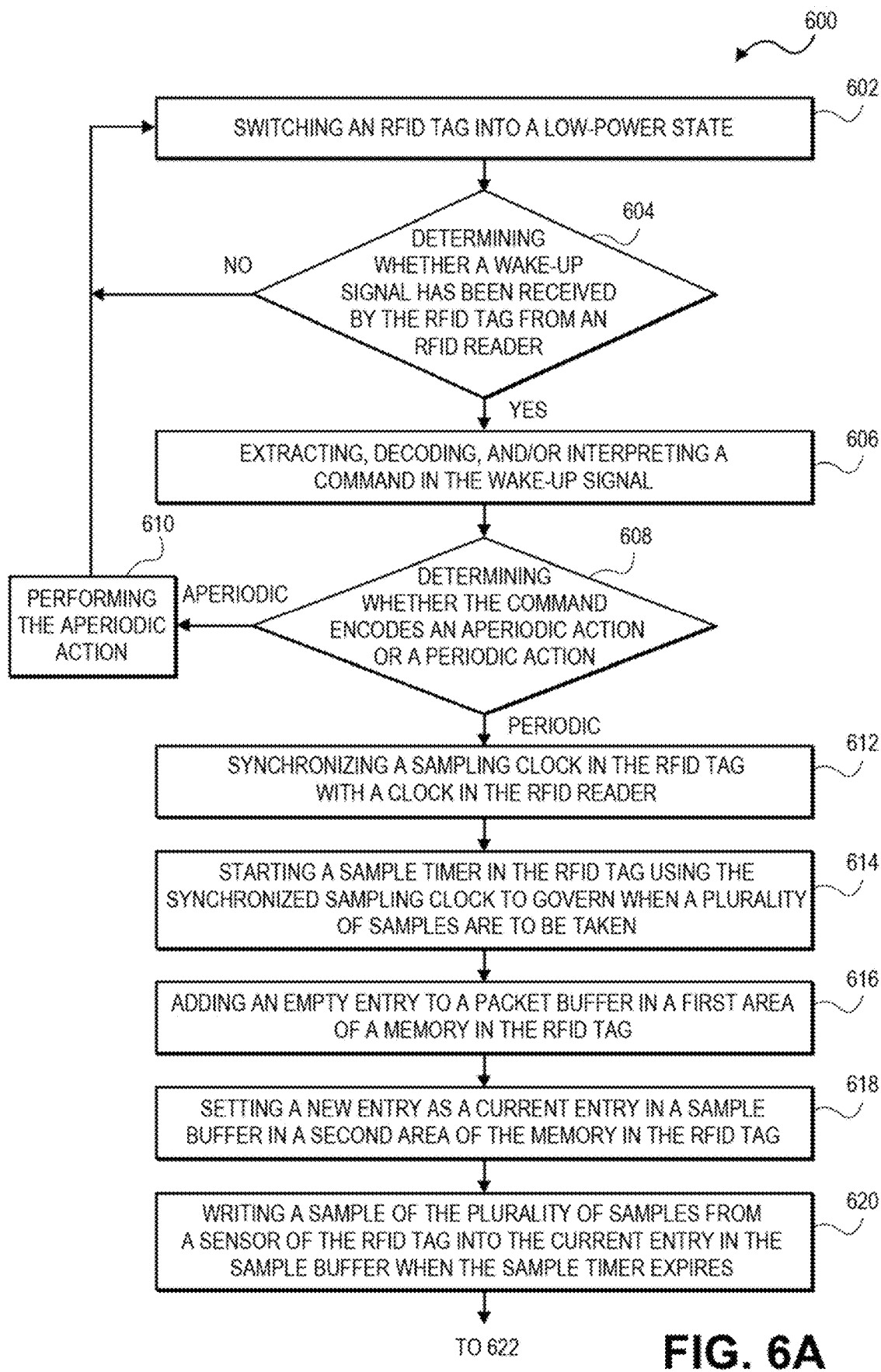
FIGS. 6A and 6B illustrate a flowchart of method for a data acquisition protocol for the RFID tag, according to an embodiment.
Figure 6B:
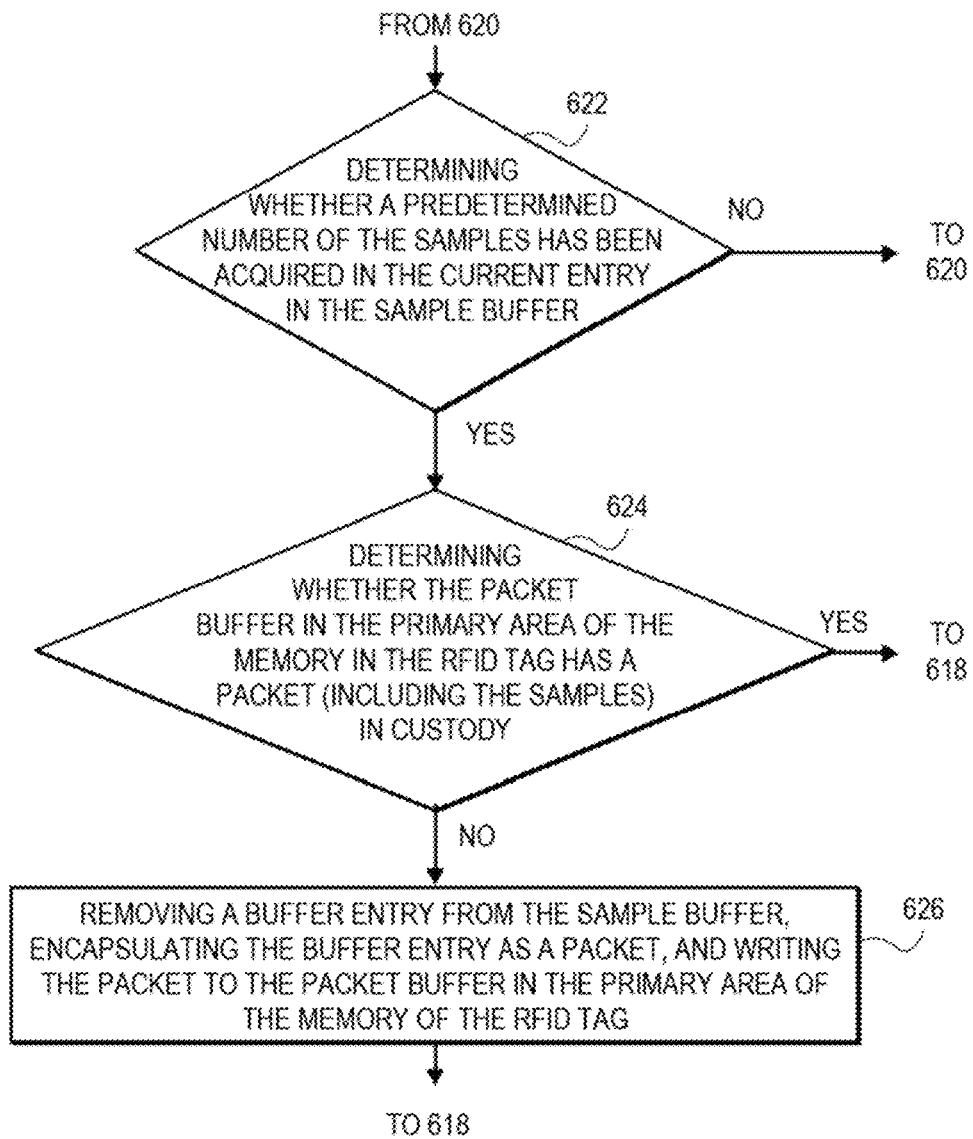

FIGS. 6A and 6B illustrate a flowchart of a method 600 for a data acquisition protocol for the RFID tag 300, 400, according to an embodiment. The steps in the method 600 may be performed by the RFID tag(s) 300, 400. The method 600 may include placing/switching the RFID tag 300, 400 into a low-power (e.g., inactive) state, as at 602. In the low-power state, the RFID tag 300, 400 may be sleeping and/or hibernating. Once RFID the tag 300, 400 is in the low-power state, method 600 may also include determining whether a wake-up signal has been received by the RFID tag 300, 400 from the RFID reader 200, as at 604. If no wake-up signal has been received, the RFID tag 300, 400 may revert back and/or remain in the low-power state. If the wake-up signal has been received, the tag 300, 400 may switch into an active state where it is configured to extract, decode, and/or interpret a command embedded in the wake-up signal, as at 606.

The method 600 may also include determining whether the command encodes an aperiodic action or a periodic action, as at 608. An aperiodic action may include, for example, generating a calibration value set or generating a health and status report. A periodic action may include, for example, periodic sensor sampling using the sensor element 320, 420. If the command encodes an aperiodic action, the RFID tag 300, 400 may perform that action and then return to sleep, as at 610. However, if the command encodes a periodic action, a sampling clock of the processor 310, 410 in the RFID tag 300, 400 may synchronize with a clock in the RFID reader 200, as at 612.

The RFID tag 300, 400 may then begin acquiring samples using the sensor 320, 420. This may include starting a sample timer in the RFID tag 300, 400 using the synchronized sampling clock to govern when samples are to be taken, as at 614. The method 600 may also include adding an empty entry to a packet buffer in the primary area of the RFID memory 312, 414, as at 616. As used herein, an "empty entry" refers to an entry indicating that no samples are present in a packet. As used herein, a "packet buffer" refers to data that is readable over the air via RFID protocols containing samples and metadata encapsulated as a packet. In other words, a packet includes one or more samples with optional header and footer data. As used herein, a "sample buffer" refers to data that has been gathered in internal memory and is not readable over the air via RFID protocols. The packet buffer may also be referred to as the primary area of the memory 312, 414. The sample buffer may also be referred to as the secondary area of the memory 312, 412.

The method 600 may also include setting a new entry as a current entry in the sample buffer in the secondary area of the RFID memory 312, 412, as at 618. As used herein, a "new entry" refers to an entry formatted to indicate that no samples have yet been populated into it.

The method 600 may also include writing a sample (or next sample) from the sensor 320, 420 into the current entry in the sample buffer when the sample timer expires, as at 620. In an embodiment, a sample may be or include a measurement by the sensor 320, 420. Simultaneously, the current time base estimate of the sensor will be updated to include the sample timer interval.

The method 600 may also include determining whether a predetermined number of samples has been acquired in the current entry in the sample buffer in the secondary area of the RFID memory 312, 412, as at 622. If the predetermined number of samples has not been acquired, the method 600 may loop back around to the previous step. If the predetermined number of samples has been acquired, then the method 600 may include determining whether the packet buffer in the primary area of the memory 312, 414 of the RFID tag 300, 400 has a packet (e.g., including the samples) in custody, as at 624. If the packet buffer of the memory 312, 414 has the packet (e.g., including its samples and metadata) in custody, then the method 600 may loop back around to step 618. If the packet buffer of the memory 312, 414 does not have the packet (e.g., including its samples) in custody, then the method 600 may include removing a buffer entry from the sample buffer memory 312, 412, encapsulating the buffer entry as a packet, and writing the packet to the packet buffer in the primary area of the memory 312, 414 of the RFID tag 300, 400, as at 626.

The method 600 may also include collecting a next sample (e.g., a $CO_2$ sample) using the sensor 320, 420 (as at 618) after having first drawn a new sample buffer entry, in response to the sample timer expiring. In another embodiment, the method 600 may be used to gather aperiodic data by generating a sample only when an event of interest has happened since the last timer expiration.

The tag software also includes a set of instructions to cause the RFID tag 300, 400 to (1) cease acquiring data and enter an idle state and/or (2) execute any other configuration/sampling access strategy directed by the interrogator software.

Protocol for Offline Data Gathering

Embodiments disclosed herein provide a long-lived wireless RFID-enabled sensor system that on command can begin acquiring time-tagged sensor samples that can be made available for transfer at an arbitrarily later time to any of a network of RFID interrogators. The sensor system may, optionally, after hibernating at low power before waking up, be ordered by an RFID interrogator in a network of such interrogators to begin acquiring time-stamped data for eventual transmission. Managing access to each RFID tag 300, 400 may include placing a time-base estimate on each RFID tag 300, 400 for synchronization at the outset of sampling with the interrogator software and for updating the time-base estimate over the course of its operation. This functionality may be implemented in the sensor controller 500, encoded as a set of instructions that run in the sensor controller processor 510, prior to the iteration of the sensor controller software encoded in the flow chart of FIG. 7. This time-base estimate may be coincident with the command issued by the sensor controller 500 to the tag 300/400 to wake up from a low-power hibernation state and begin sampling.

The process of receiving this command and then acting upon it is described in the tag data acquisition software flow chart of method 600 as depicted in FIGS. 6A and 6B. Prior to reception of the command, the RFID sensor tag 300, 400 may be in the low-power hibernation state. From this state, it may wake up to receive "aperiodic" house-keeping or on-demand sampling commands, after which it may return to the hibernation state, or it may wake up to receive the "periodic sampling" command, which instructs it to begin the act of sampling a time series of sensor data. Once this command has been received, the RFID sensor tag 300, 400 can then leave the coverage area of the network of RFID readers 200 for a connection-deprived environment and still record time-stamped sensor data for later delivery once contact with the RFID interrogator system has been restored. A time-base estimate may be encoded into the command message, and this time base, updated as samples are acquired at a fixed rate, may be used to time-tag packets of measurement data. In one embodiment, the sample rate may be fixed. In another embodiment, it may also be encoded in the command message along with the time-base estimate.

Per the method 600 of FIGS. 6A and 6B, once this command has been received, the RFID tag 300, 400 may synchronize its sampling clock and then start a sample timer, upon whose expiration a set of samples may be acquired. The tag 300, 400 may maintain one "sample buffer" (or more) of samples to be eventually transmitted over the air as "packets" to the system of RFID readers 200. This sample buffer may be maintained in the memory 312, 412 internal to the sensor tag MCU 310, 410.

At the outset of sampling, or when a prior sample buffer entry has been filled with a set number of samples (e.g., the number of samples capable of being held in a "packet" in the packet buffer), a new buffer entry may be added to the sample buffer(s). While a buffer entry is not yet full, samples acquired on expiration of the sample timer may be inserted into the buffer entry along with a time-stamp encoding their time of acquisition.

Samples may be inserted into one or more sample buffers according to some metric of importance. These buffers may be capable of interacting with a separate data transmission protocol (to be discussed below as part of the method 900) to remove sample buffer entries from the sample buffer for transmission once the RFID tag 300, 400 is again in contact with an element of an RFID interrogator network. Multiple sample buffers, if implemented, may be assigned varying priorities. Both the importance of each sample buffer and the importance of sample buffer entries within the sample buffers may be taken into account in determining which sample buffer entries to send to the RFID interrogator network first once contact has been restored. In one embodiment, there is a single sample buffer, and the metric of performance is sample buffer entry age as described by the time-stamps of samples in the sample buffer entry. In another embodiment, there are discrete sample buffers for each sensor type, and priority is determined by giving some sensors attached to the device greater importance than others. In another embodiment, the priority is determined by some pre-processing applied to the data itself (e.g., threshold exceedance).

When a complete sample buffer entry of samples is acquired into a sample buffer, the RFID sensor tag 300, 400 may check to see if the RFID tag packet buffer memory 312, 414 in the RFID module 315, 415, which is accessible over-the-air to the network of RFID readers 200, is currently filled with a packet. If it is not, the highest priority sample buffer entry may be removed from the internal sample buffer maintained in the memory 312, 412, encapsulated as a packet, and written to packet buffer memory 312, 414 in the RFID module 315, 415. If the RFID module packet buffer memory 312, 414 is already filled with a packet, no action may be taken to remove the highest priority sample buffer entry from the internal sample buffer, and data acquisition may proceed as described above with the sample buffer unmodified. Taken together, these instructions implement the "store" function of the store-and-forward suite of tag, interrogator, and controller software described herein.

Protocol for Detecting Sensor Tags and Initiating Data Transfer

Once the RFID tags 300, 400 have been commanded to begin gathering time-series of sensor samples, they may then be given opportunities to offload those samples to interested clients of the data for analysis and storage. Due to the dynamic nature of an environment where people, machinery, and inventory are constantly in motion, it is assumed that contact between the RFID tag 300, 400 and the RFID reader 200 initiating the command may be lost. In fact, it may be that sensor tag mobility may make it likely that the RFID tag 300, 400 may find itself in the fields of view of other RFID interrogators long before it returns to the field of view of the RFID interrogator 200 that originated the command to begin sampling. It may also be that, even if RF coverage between an RFID tag 300, 400 and the initiating interrogator 200 is not lost, the interrogator 200 may give priority to its "inventory management" role for an extended time and be disallowed by management software to enter the data transfer subroutine, impacting data transfer the same as if there were a loss of RF coverage.

To accommodate this, we may provide the system with a way to recognize and exploit "contact opportunities" between the sensor tag 300, 400, which has begun logging data, and the interrogator 200 that can subsequently be directed to transfer those samples from the sensor tag 300, 400. Taken together, these instructions implement the sensor controller's contribution to the "forward" function of the store-and-forward suite of tag, interrogator, and controller software described herein.

The system may detect that an RFID sensor tag 300, 400 with data is present in the fields of view of a subset of interrogators in a set of networked RFID interrogators. An optimum interrogator 200 for initiating the custody transfer of data with the tag 300, 400 may then be selected. This protocol is resident on the sensor controller 500, which shares a network connection via a backhaul port 540 with a set of RFID readers 200 that are themselves capable of receiving commands and streaming telemetry on a common network using a backhaul port 240. The network of RFID interrogators 200 may operate in the standard mode of scanning for and returning the identifiers (IDs) of tags including RFID sensor tags 300, 400 they see in their field of view (e.g., the "electronic product codes" or "EPCs" for the RFID protocol EPC Global Class 1 Generation 2). Each return contains a tag ID (e.g., an EPC), and it can optionally contain descriptive information about the read such as received signal strength indicator (RSSI), the RF channel on which the read occurred, the interrogator antenna on which the tag 300, 400 was read, the number of times the tag 300, 400 was read in a unit of time, etc. These returns are placed on the network for a centralized entity, such as an inventory management system, to receive, record, and analyze.

The sensor controller 500 is responsible for observing the tag reads recorded by the set of networked RFID interrogators and filtering for the subset of sensor tags 300, 400. When the sensor controller 500 sees a sensor tag 300, 400 in the feed of interrogation results from the network of RFID interrogators 200, it then makes a determination as to whether the RFID tag 300, 400 is likely to have logged data that needs to be offloaded. The information to make this decision may be encoded in the tag interrogation return itself (e.g., reserved bits in the tag EPC or elsewhere in user memory to encoded presence of data). In another embodiment, the information to make this decision may be maintained by the sensor controller 500 in a database (e.g., recording sample rate and last time a sample was recovered, from which an estimate of remaining un-recovered data can be determined). Once the sensor controller 500 has determined that an interrogated sensor tag 300, 400 is suitable for data transfer, it then determines which of the RFID readers 200 that saw the tag 300, 400 should be tasked with the data recovery. This determination may be based on a score assigned to each interrogator's read of the tag 300, 400, using such information as received signal strength indicator (RSSI), read count per unit time, load balancing between inventory management and sensor data transfer at each RFID reader 200, or other such figures of merit. As used herein, "load balancing" refers to ensuring that an individual RFID reader 200 spends a predetermined time in inventory management mode. Thus, even when a first RFID reader 200 has an optimal view of an RFID tag 300, 400, a second RFID reader may be selected for the data transfer when the first RFID reader 200 has exceeded allowable time spent outside of the inventory management mode over a given time period. As used herein, the inventory management mode refers to the mode in which the RFID reader 200 requests and returns only the identifiers of the RFID tags 300, 400 in its field of view, as opposed to requesting and returning any sensor data associated with those identifiers.

Figure 7:
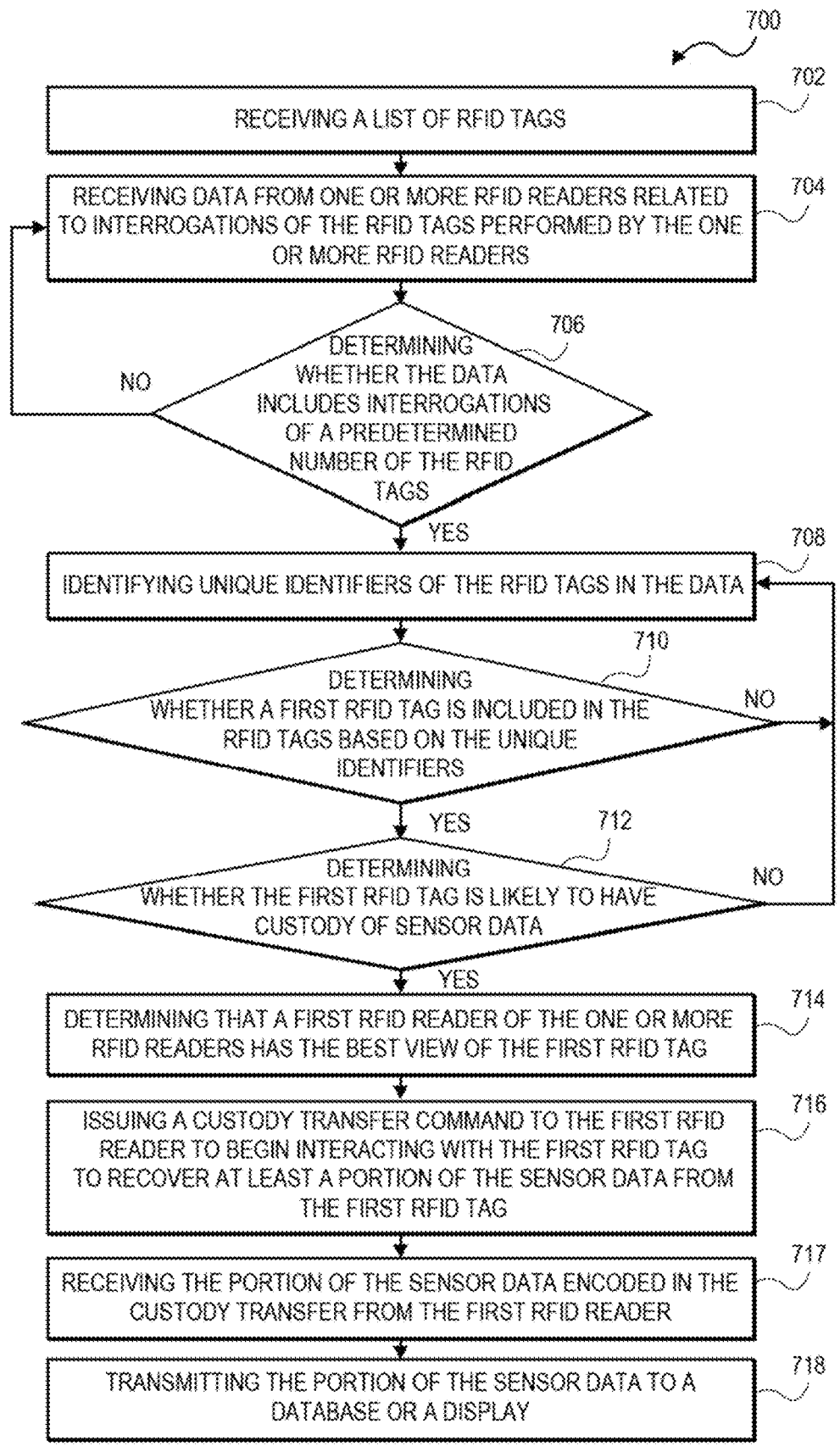
FIG. 7 illustrates a flowchart of a method for using the sensor controller, according to an embodiment. More particularly, the method may use an RFID sensor controller to subscribe to the interrogation feeds from a networked set of RFID interrogators, determine if an RFID tag of interest is in the interrogation feed, determine if the RFID tag of interest is likely to have custody of sensor data, to determine an optimal access strategy (including selecting an RFID interrogator), and subsequently send a message to an RFID interrogator commanding it to take custody of the RFID tag's stored sensor data.

FIG. 7 illustrates a flowchart of a method 700 for using the sensor controller 500, according to an embodiment. The steps in the method 700 may be performed by the sensor controller 500. More particularly, the sensor controller 500 may include a set of instructions ("sensor controller software") stored on the memory of the processor 510 in FIG. 5 that may be configured such that, when executed, the sensor controller 500 is caused to perform the operations described below.

The method 700 may include the sensor controller 500 receiving a list of sensor-bearing RFID tags 300, 400 for which it is responsible, as at 702. The method 700 may also include receiving (e.g., subscribing over a network connection to) data from the RFID readers 200 related to RFID tag interrogations performed by the RFID readers 200, as at 704. The sensor controller 500 may subscribe to the results while the RFID readers 200 are operating in an interrogate-only "inventory management" mode. In another embodiment, the method 700 may also include providing the sensor controller 500 with some other technique for recognizing sensor tags 300, 400 in the inventory management data stream such as common EPC code prefixes among sensors of a similar type. This allows the sensor controller 500 to subsequently determine whether an RFID tag 300, 400 of interest is in the field of view of one or more RFID readers 200, determine if that RFID tag 300, 400 is likely to contain time-series sensor data that it has yet to offload, and make a determination as to which of the RFID readers 200 that observed the tag 300, 400 has an optimal view, according to some score. As used herein, a first RFID reader 200 has an optimal view of the tag 300, 400 (when compared to other RFID readers) when one or more metrics (e.g., signal strength) describing the tag read are numerically superior for the first RFID reader 200 (when compared to other RFID readers).

The method 700 may also include determining whether the data includes interrogations of a predetermined number of the RFID tags 300, 400, as at 706. If the data does not include interrogations from the predetermined number of RFID tags 300, 400, then the method 700 may loop back around to the previous step. If the data includes interrogations of the predetermined number of RFID tags 300, 400, then the method 700 may include identifying unique identifiers of the RFID tags 300, 400 in the data, as at 708. Said another way, this may include monitoring the results (e.g., of inventory management RFID interrogations streamed over the network) from individual RFID readers 200 for unique identifiers of the RFID tags 300, 400 to which the sensor controller 500 is subscribed. The tag streams of the RFID tags 300, 400 may be monitored for (1) presence of a subscribed tag in the field(s) of view of one or more RFID readers 200 and (2) evidence that the subscribed tag of interest is bearing sensor data, either as presented by the tag itself or by information in a database indexed by the tag's unique identifier.

The method 700 may also include determining whether a predetermined (e.g., first) RFID tag 300, 400 is detected/included in the RFID tags 300, 400 based on the unique identifiers, as at 710. Said another way, this may include determining that the first RFID tag is detected based on the results (e.g., of inventory management RFID interrogations streamed over the network). In one embodiment, this step may be performed for a single RFID tag 300, 400. In another embodiment, this step may be performed for a plurality of RFID tags 300, 400, and the following steps may be iterative. In other words, the following steps may be performed for each RFID tag 300, 400.

If the RFID tag 300, 400 is not detected, then the method 700 may loop back around to step 708. If the first RFID tag 300, 400 is detected, then the method 700 may include determining whether the first RFID tag 300, 400 is likely to have custody of sensor data (e.g., data measured by the sensor 320, 420), as at 712. As used herein, "likely to have custody" refers to evidence that the subscribed tag of interest is bearing sensor data, either as presented by the tag itself or by information in a database indexed by the tag's unique identifier. If the detected RFID tag 300, 400 is not likely to have custody of the sensor data, then the method may loop back around to step 708. If the detected RFID tag 300, 400 is likely to have custody of the sensor data, then the method 700 may include determining that a first RFID reader 200 has the best view of the detected RFID tag 300, 400, as at 714. As used herein, the "best view" refers to appearance of the RFID tag of interest in a reader's interrogation stream where such an appearance contains an element, such as a received signal strength indicator (RSSI), that is measurably superior to the corresponding element in that tag's appearance in the interrogation stream of another reader.

The responsibility for indicating that a sensor tag 300, 400 has sensor data to transfer can fall to the sensor tag 300, 400 itself, the sensor controller 500, or a combination of the two. In one embodiment, the sensor controller 500 modifies data that is returned during an inventory management interrogation (e.g., a bit or bits of the tag EPC itself or some small amount of user memory backscattered during a tag operation embedded in the interrogation). In another embodiment, the sensor controller 500 tracks the rate at which the RFID tags 300, 400 are producing data and the time-stamp of the last data transfer to determine if new data has been collected subsequent to the data in the last recovered packet. In another embodiment, both preceding techniques can be used to increase robustness.

Once an optimal RFID reader 200 is selected (e.g., the RFID reader 200 with the best view), the sensor controller 500 then uses its network interface to issue a custody transfer command to the first RFID reader 200 that best sees the RFID tag 300, 400 to begin interacting with the first RFID tag 300, 400 to recover at least a portion of its sensor data, as at 716. In an example, the sensor data may be logged time-series sensor data.

The method 700 may also include receiving the portion of the sensor data encoded in the custody transfer from the first RFID reader 200, as at 717. The method 700 may also include transmitting the portion of the sensor data from the sensor controller 500 to a database or a display, as at 718.

The steps of method 700 may be performed via human-machine interaction (e.g., via a GUI or other input control) or alternatively may be performed automatically. In at least one embodiment, some of the steps of the method 700 may be performed via human-machine interaction while other steps of the method 700 may be performed automatically.

Protocol for Completing Data Transfer

Figure 8A:
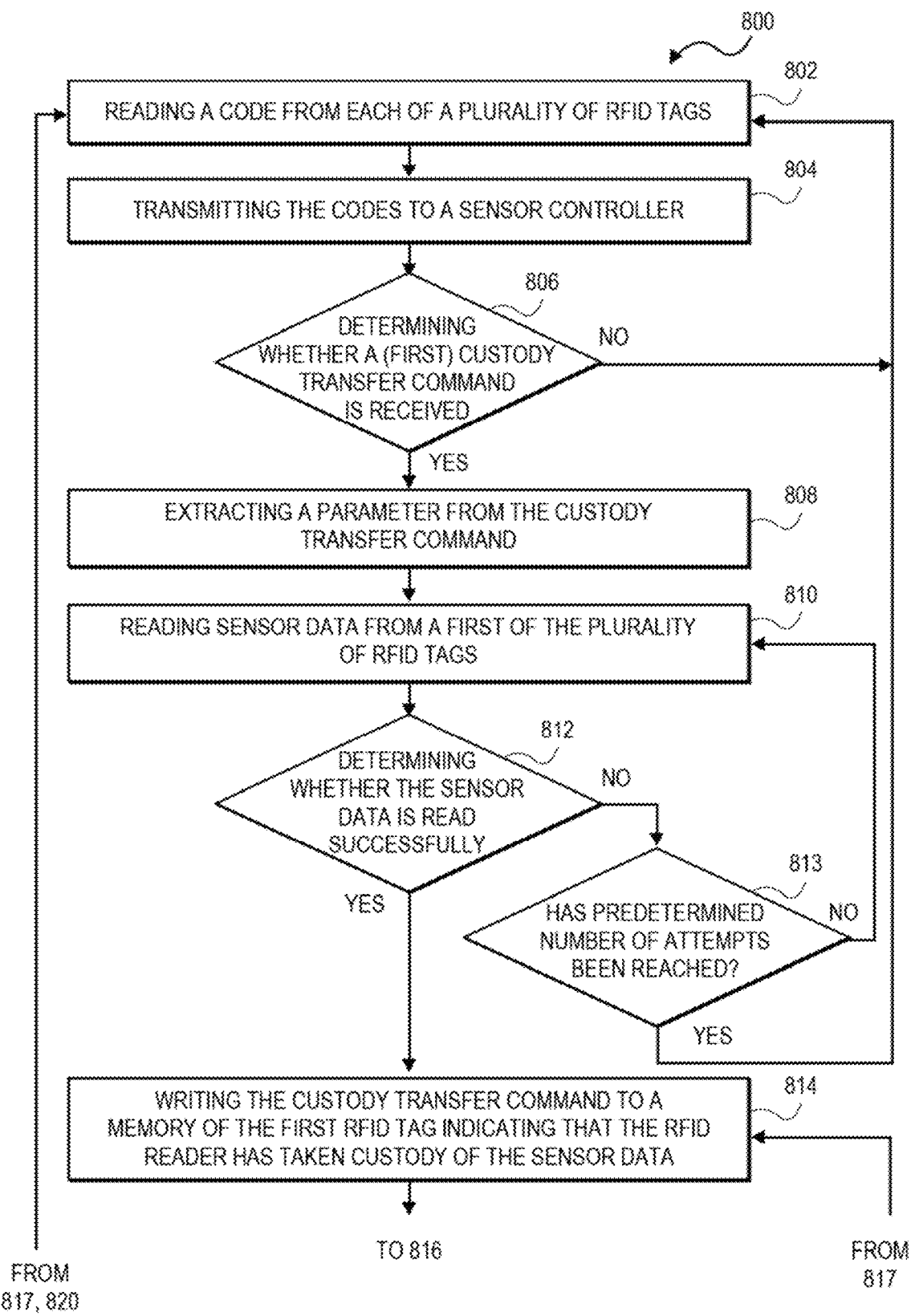
FIGS. 8A and 8B illustrate a flowchart of a method for using the RFID reader, according to an embodiment. More particularly, the method may use the RFID reader to alternate between (1) interrogating and streaming tag interrogation results, and (2) receiving and processing commands to order an RFID sensor tag to transfer custody of its stored sensor data to the RFID interrogator, according to an embodiment.
Figure 8B:
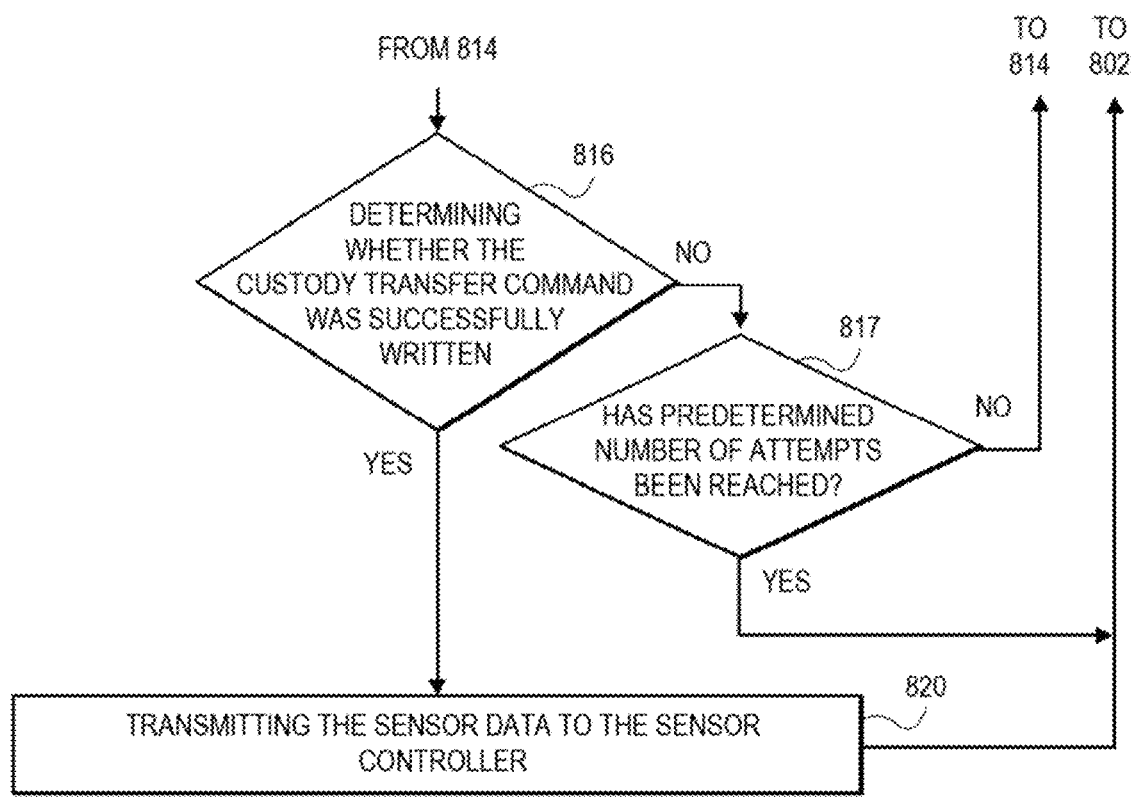

Once the sensor controller 500 has identified a data-bearing sensor tag 300, 400 and issued a custody transfer command as in the method 700, this command may then be intercepted by the target RFID reader 200 and acted upon using the target RFID sensor tag 300, 400. FIGS. 8A and 8B illustrate a flowchart of a method 800 describing the role of the RFID reader 200, according to an embodiment. The steps in the method 800 may be performed by the RFID reader 200.

At the outset of the method 800, the RFID reader 200 is operating in inventory management mode in which it reads/interrogates the RFID tags 300, 400 for tag electronic product codes (EPCs) of the RFID sensor tags 300, 400, as at 802. In one embodiment, this may include the RFID reader 200 interrogating (e.g., performing step 802) for a predetermined amount of time (e.g., from about 10 seconds to about 30 seconds). The method 800 may also include periodically transmitting results of the tag EPC interrogation (e.g., the codes) from the RFID reader 200, over a shared network connection, to the sensor controller 500, as at 804. Periodically, the RFID reader 200 may check to see if it has received a custody transfer command from the sensor controller 500 and may switch from periodic interrogating/transmitting to servicing the custody transfer command, as at 806. This may be referred to as a custody transfer servicing mode in which the RFID reader 200 begins reading sensor data associated from a tag associated with a tag identifier and writing command data to the tag associated with the tag identifier to indicate that it has taken custody of the sensor data. In one example, this check happens periodically every 10-30 seconds. If the custody transfer command is not received, the method 800 may loop back around to step 802.

Upon reception of the custody transfer command, the RFID reader 200 may extract one or more parameters from the custody transfer command, as at 808. The parameters may be or include the tag identifier (e.g., EPC) and other data such as an interrogator antenna port identifier, an RF channel, or an RF power level estimated by the sensor controller 500 to give the RFID reader 200 in question the best chance of successfully interacting with the RFID tag 300, 400.

The RFID reader 200 may then attempt a custody transfer of the sensor data on the RFID tag 300, 400 to the sensor controller 500. This begins with the RFID reader 200 reading the sensor data contained, in one embodiment, in the memory 312, 414 of the RFID tag 300, 400, as at 810. The sensor data may be read according to the one or more parameters.

The method 800 may also include determining whether the sensor data is read successfully by the RFID reader 200, as at 812. If unsuccessful, the read may be re-attempted a predetermined number of times (e.g., three times), as at 813. If still unsuccessful after the predetermined number of times, the custody transfer attempt may terminate, and the method 800 may loop back around to step 802.

In one embodiment, if the read is successful before reaching the predetermined number of times, then the RFID reader 200 may write a second custody transfer command to the memory 312, 414 of the RFID sensor tag 300, 400 indicating that the RFID reader 200 has taken custody of the sensor data, as at 814. The method 800 may also include determining whether the second custody transfer was successfully written, as at 816. If unsuccessful, the write may be re-attempted a predetermined number of times (e.g., three times), as at 817. If still unsuccessful after the predetermined number of times, the custody transfer attempt may terminate, the RFID sensor tag 300, 400 may retain custody of the sensor data packet, and the method 800 may loop back around to step 802. If it is successful before reaching the predetermined number of times, then the recovered sensor data may be transmitted from the RFID reader 200 to the sensor controller 500 (or other interested subscribers), as at 820. The interested subscribers may include data consumers such as a display or a database. The method 800 then loops back around to step 802.

In this embodiment, the RFID reader 200 may then return to normal RFID inventory management interrogations until instructed by the sensor controller 500 to switch to data transfer mode. In another embodiment, it may attempt several packet data transfers from the RFID tag 300, 400 in question before returning to inventory management interrogations. This may be encoded in the custody transfer command from the sensor controller 500, or it may be guided by a pre-configured parameter in the RFID interrogator data transfer software implementation. In one embodiment, it may proceed a fixed number of times before returning to inventory management interrogations, or until the tag 300, 400 has indicated that has no more data to transfer, whichever comes first. In another embodiment, it may proceed until the RFID tag 300, 400 has indicated it has no more data to transfer. In another embodiment, the sensor controller 500 may attempt data transfers from several RFID tags 300, 400 encoded in a single custody transfer message before returning to inventory management interrogations.

Figure 9:
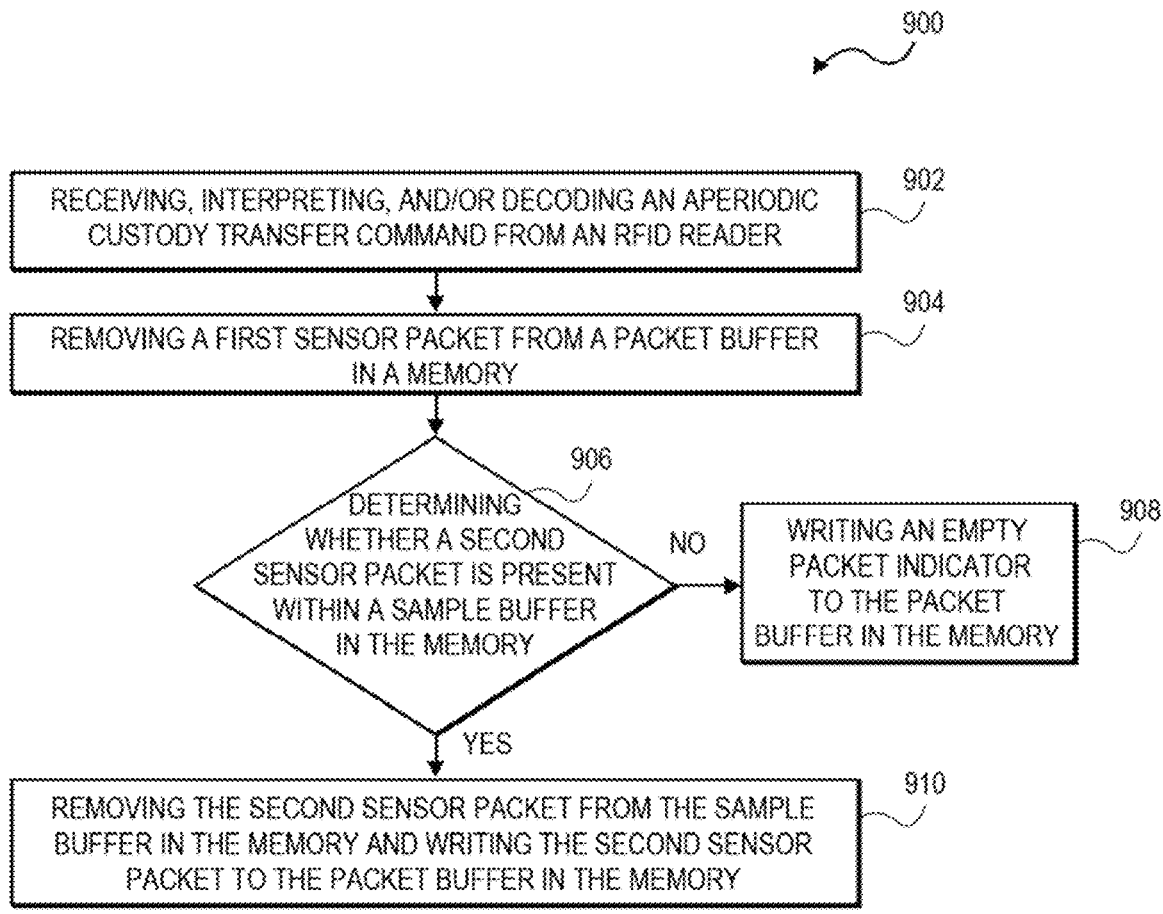
FIG. 9 illustrates a flowchart of a store-and-forward data transmission protocol for the RFID tag, according to an embodiment.

FIG. 9 illustrates a flowchart of a method 900 of the RFID tag 300, 400 interacting with the method 800, according to an embodiment. The steps in the method 900 may be performed by the RFID tag(s) 300, 400. More particularly, the method 900 may be stored in the MCU memory 312, 412 and acted upon by the MCU 310, 410 of the RFID tag 300, 400. The method 900 may operate concurrently with the tag data acquisition method described in the method 600. In one embodiment, this concurrence is implemented in a single-threaded MCU 310, 410 using a scheduler. In another embodiment, it is implemented in a multi-threaded MCU 310, 410.

During the execution of method 900, the RFID tag 300, 400 may either be hibernating or acquiring periodic sensor data, as described in method 600. When the RFID reader 200 receives a custody transfer message from the RFID sensor controller 500, it may first attempt an RFID memory read of the data packet from the RFID memory 315, 415 of the RFID sensor tag 300, 400 as described in the method 800. This process does not generate a notification to the RFID sensor tag 300, 400 upon successful completion, as it is a passive process powered entirely by the RFID reader 200. Upon successful completion of the RFID memory read, the RFID reader 200 may then issue an RFID memory write, as described in the method 800, to pass data to the RFID tag 300, 400 that the reader 200 has taken custody of the sensor data packet in the RFID memory 312, 414 of the tag 300, 400.

The method 900 may begin with receiving, interpreting, and/or decoding a command from the RFID reader 200, as at 902. The command may be or include an aperiodic custody transfer command.

Once the custody transfer command has been received, the RFID tag 300, 400 may then remove a first sensor packet from the packet buffer in the memory 312, 414 of the RFID tag 300, 400, as at 904. The RFID tag 300, 400 may then check the sample buffer stored in the memory 312, 412 (and described in method 600) to see if a sensor packet's worth of samples have been acquired and stored for later transfer over the RFID network, as at 906. If sufficient samples are not present, the RFID tag 300, 400 may write an empty packet indicator to the packet buffer in the memory 312, 414, as at 908. The packet buffer may then be marked as empty. In other words, the packet buffer may be absolved of the responsibility to retain a copy of the current packet data, thereby freeing it to accept custody of subsequent packet data. As used herein, "freeing" means to absolve the packet buffer of the responsibility to retain a copy of the current packet data. If sufficient samples are present, the method 900 may include removing an entry from the sample buffer(s) according to some metric of priority, as described in method 600, encapsulating it as a packet, and writing that packet to the packet buffer of the memory 312, 414, as at 910. In one embodiment, a single sample buffer with a single method of determining priority is present and the method for determining packet priority is straightforward.

In another embodiment, multiple sample buffers of varying buffer priorities, each with its own method for determining priority of the sample entries within the buffer, may be present, and the RFID sensor tag 300, 400 may apply higher-level logic to mediate between these differing buffer and buffer entry priorities. In one embodiment, only "full" sample buffer entries that contain the maximum number of samples pre-allocated to each packet may be removed from a sample buffer, encapsulated as a packet, and written to the packet buffer in the RFID memory 312, 414. In another embodiment, partial entries may be removed from a sample buffer, encapsulated as a packet, and written to the packet buffer in the RFID memory 312, 414 (e.g., in a case where only one packet is present in the internal buffer but it is only partially filled at the time a custody transfer command is being processed). Finally, if no sample entries are present and allowed to be removed from the sample buffer at the time a custody transfer command is being processed, an "empty" packet may be written to the packet buffer in the memory 312, 414 to indicate that the RFID sensor tag 300, 400 is not in possession of yet-to-be-transferred sensor data.

What is claimed is:

1. A system, comprising:
   a plurality of radiofrequency identification (RFID) tags including a first RFID tag, the first RFID tag configured to perform RFID tag operations comprising:
      acquiring one or more samples using a sensor of the first RFID tag;
      writing the one or more samples in a memory of the first RFID tag; and
      transferring custody of the one or more samples to a first RFID reader on request;
   a plurality of RFID readers including the first RFID reader, the first RFID reader configured to perform RFID reader operations comprising:
      reading an identifier from each of the plurality of RFID tags in view of the first RFID reader during an inventory management mode;
      transmitting the identifier from each of the RFID tags in view to a sensor controller during the inventory management mode, wherein transmitting the identifier comprises transmitting a first identifier for the first RFID tag to the sensor controller;
      receiving a first custody transfer command from the sensor controller based at least in part on the sensor controller receiving the first identifier;
      based at least partially upon receiving the first custody transfer command, reading the one or more samples from the first RFID tag to take custody of the one or more samples during a custody transfer servicing mode; and
      during the custody transfer servicing mode, writing a second custody transfer command to the memory of the first RFID tag to indicate that the first RFID reader has taken custody of the one or more samples;
   wherein the sensor controller is configured to be in communication with the plurality of RFID readers, and wherein the sensor controller is configured to perform sensor controller operations comprising:
      receiving the first identifier from the first RFID reader during the inventory management mode;
      determining that the first RFID tag is in view of the first RFID reader based on receiving the first identifier; and
      transmitting the first custody transfer command to the first RFID reader to cause the first RFID reader to request the one or more samples from the first RFID tag.

2. The system of claim 1, wherein the sensor controller operations further comprise:
   receiving the first identifier from a second RFID reader of the plurality of RFID readers during the inventory management mode;
   determining the first RFID reader has an optimal view of the first RFID tag, wherein the optimal view determination is based on greater signal strength between the first RFID reader and the first RFID tag than between the second RFID reader and the first RFID tag; and
   based on the optimal view determination, selecting the first RFID reader to read the one or more samples from the first RFID tag to take custody of the one or more samples during the custody transfer servicing mode.

3. The system of claim 2, where sensor controller operations further comprise transmitting a command from the sensor controller to the first RFID reader with the optimal view to instruct the first RFID tag to synchronize a sample clock, to sample the sensor data, and to store the sensor data.

4. The system of claim 1, wherein the sensor controller operations further comprise:
   receiving the first identifier from a second RFID reader of the plurality of RFID readers during the inventory management mode;
   determining that the first RFID reader has more available time to divert from the inventory management mode when compared to the second RFID reader; and
   based on the available time determination, selecting the first RFID reader to read the one or more samples from the first RFID tag to take custody of the one or more samples during the custody transfer servicing mode.

5. The system of claim 1, wherein:
   the memory has a sample buffer configured to store the one or more samples from the sensor;
   the memory has a packet buffer configured to store a first packet including the one or more samples, the packet buffer being configured to be accessible over-the-air to transmit the first packet to one or more of the plurality of RFID readers;
   reading the one or more samples from the first RFID tag to take custody of the one or more samples during the custody transfer servicing mode comprises transmitting the first packet to the first RFID reader;
   writing the second custody transfer command to the memory of the first RFID tag to indicate that the first RFID reader has taken custody of the one or more samples comprises indicating that that the first RFID reader has taken custody of the first packet;

the packet buffer is configured to be available for a second packet after the first RFID tag receives the second custody transfer command; and the second packet from the sample buffer is transferred to the packet buffer in response to the first RFID reader writing the second custody transfer command to the memory of the first RFID tag.

6. A method for the collection of information from a plurality of radio-frequency identification (RFID) tags using an RFID system, the method comprising:

scanning for the plurality of RFID tags with a plurality of RFID readers, wherein the plurality of RFID readers includes a first RFID reader having a first coverage area and configured to detect one or more of the plurality of RFID tags when positioned in the first coverage area;

receiving RFID tag identifiers corresponding to the plurality of RFID tags with the first RFID reader, wherein the RFID tag identifiers include a first RFID tag identifier corresponding to a first RFID tag of the plurality of RFID tags;

transmitting the RFID tag identifiers from the first RFID reader to a sensor controller;

identifying the first RFID tag identifier in the RFID tag identifiers using the sensor controller;

determining that the first RFID tag is likely to have custody of sensor data;

issuing a first custody transfer command from the sensor controller to the first RFID reader based at least in part on the determination that the first RFID tag is likely to have custody of the sensor data;

reading the sensor data from the first RFID tag using the first RFID reader in response to the first custody transfer command; and writing a second custody transfer command from the first RFID reader to the first RFID tag.

7. The method of claim 6, wherein the determination that the first RFID tag is likely to have custody of the sensor data is at least partially based on information in a database of the sensor controller indexed by the first RFID tag identifier.

8. The method of claim 6, wherein the plurality of RFID tags also includes a second RFID reader having a second coverage area and configured to detect one or more of the plurality of RFID tags when positioned in the second coverage area, wherein the method further comprises:

receiving the RFID tag identifiers corresponding to the plurality of RFID tags with the second RFID reader, wherein the RFID tag identifiers include the first RFID tag identifier corresponding to the first RFID tag of the plurality of RFID tags;

transmitting the RFID tag identifiers from the second RFID reader to the sensor controller;

identifying the first RFID tag identifier in the RFID tag identifiers from the first and second RFID readers using the sensor controller; and determining that the first RFID reader has a more optimal view of the first RFID tag than the second RFID reader.

9. The method of claim 8, wherein the first custody transfer command is issued to the first RFID reader and not the second RFID reader based upon the determination that the first RFID reader has the more optimal view of the first RFID tag than the second RFID reader.

10. The method of claim 8, further comprising transmitting a command from the sensor controller to the first RFID reader with the more optimal view to instruct the first RFID tag to synchronize a sample clock, to sample the sensor data, and to store the sensor data.

11. A system, comprising:

a radiofrequency identification (RFID) tag configured to perform RFID tag operations, the RFID tag operations comprising:

transferring custody of data in a packet buffer of a memory of the RFID tag to an RFID reader, thereby freeing the packet buffer to receive new data;

acquiring one or more samples using a sensor of the RFID tag;

storing the one or more samples in a sample buffer of the memory of the RFID tag;

removing a first entry in the sample buffer when the first entry contains greater than or equal to a threshold number of the one or more samples;

encapsulating the first entry as a packet, wherein the packet comprises the one or more samples and packet metadata;

placing the packet in the packet buffer in response to a custody transfer request from the RFID reader;

adding an empty entry to the packet buffer when the sample buffer contains less than the threshold number of the one or more samples; and allowing acquisition of new samples into a second entry in the sample buffer concurrently with processing a new custody transfer request from the RFID reader.

12. The system of claim 11, wherein transferring custody comprises:

receiving a custody transfer command from the RFID reader;

authenticating the custody transfer command with respect to the packet in custody; and marking the packet buffer as empty.

13. The system of claim 11, wherein the RFID tag operations further comprise:

receiving a wake-up signal from the RFID reader;

extracting a command from the wake-up signal;

determining that the command comprises a periodic action;

synchronizing a clock in the RFID tag with a clock in the RFID reader in response to determining that the command comprises the periodic action; and starting a timer in the RFID tag using the synchronized clock, wherein the one or more samples are acquired before the timer expires, and wherein the one or more samples are written into the current entry in the sample buffer after the timer expires.

14. The system of claim 13, wherein the RFID tag operations further comprise determining whether the packet buffer has the packet in custody in response to the sample buffer containing greater than or equal to the threshold number of the one or more samples.

15. The system of claim 14, wherein, when the packet buffer does not have the packet in custody, the RFID tag operations further comprise:

removing the buffer entry from the sample buffer;

encapsulating the buffer entry as the packet; and writing the packet to the packet buffer.

16. The system of claim 11, further comprising the RFID reader, which is configured to perform RFID reader operations, the RFID reader operations comprising:

receiving a first custody transfer command for the RFID tag from a sensor controller;

extracting one or more parameters from the first custody transfer command;

reading the one or more samples from the RFID tag based at least partially upon the one or more parameters; and writing a second custody transfer command to a command buffer of the memory of the RFID tag to indicate that the RFID reader has taken custody of the one or more samples.

17. The system of claim 16, wherein the one or more samples comprise one or more physical environmental measurements.

18. The system of claim 16, wherein the RFID reader operations further comprise:

repeating reading the one or more samples and writing the second custody transfer command until either an empty buffer entry is read or the RFID reader is compelled to return to an inventory management mode after expiration of a timer governing time spent outside of the inventory management mode.

19. The system of claim 11, further comprising a sensor controller configured to perform sensor controller operations, the sensor controller operations comprising:

receiving one or more parameters related to an interrogation of the RFID tag by the RFID reader;

identifying an identifier of the RFID tag in the one or more parameters;

determining that a likelihood that the RFID tag has custody of the one or more samples is greater than a threshold based at least partially upon the identifier;

determining that the RFID reader is in range to communicate with the RFID tag;

transmitting a custody transfer command to the RFID reader to cause the RFID reader to request the one or more samples from the RFID tag; and receiving the one or more samples from the RFID reader.

20. The system of claim 19, wherein the sensor controller operations further comprise causing the one or more samples to be displayed on a monitor, saved into a database, or both.

* * * * *